US005118356A

United States Patent [19]

Darmon et al.

[11] Patent Number: 5,118,356

[45] Date of Patent: Jun. 2, 1992

[54] PROCESS FOR CLEANING A PHOTOGRAPHIC PROCESSING DEVICE

[75] Inventors: Charles M. Darmon, Spencerport; William G. Henry, Caledonia; Paul A. Schwartz, Webster, all of N.Y.

[73] Assignee: Eastman Kodak Company, Rochester, N.Y.

[21] Appl. No.: 615,562

[22] Filed: Nov. 19, 1990

[51] Int. Cl.[5] .......................... C09G 1/00; C23G 1/02; B08B 3/08

[52] U.S. Cl. ..................................... 134/3; 134/22.16; 134/28; 134/41; 106/3; 252/142

[58] Field of Search .................... 134/3, 22.16, 28, 41; 252/142; 106/3

[56] References Cited

U.S. PATENT DOCUMENTS 4,640,713 2/1987 Harris ..................................... 106/3

FOREIGN PATENT DOCUMENTS 1430713 6/1973 United Kingdom .

*Primary Examiner*—Theodore Morris
*Assistant Examiner*—Zeinab El-Arini
*Attorney, Agent, or Firm*—Robert A. Linn

[57] ABSTRACT

Photographic processing devices such as stainless steel racks and tanks are cleaned to remove contaminants such as silver by contacting the devices with a cleaning solution comprising water, a mineral acid such as nitric acid, a soluble cerium (IV) salt such as ceric ammonium nitrate, and acetic acid. The cleaning solutions have a pH no greater than 1. The acetic acid inhibits the formation of a brown stain on the stainless steel.

4 Claims, No Drawings

PROCESS FOR CLEANING A PHOTOGRAPHIC PROCESSING DEVICE

FIELD OF THE INVENTION

This invention relates to the cleaning of a photographic process device. More particularly, this invention relates to removal of silver contaminant adhering to such a device made of stainless steel. The method employs an acidic solution comprising a mineral acid, acetic acid, a soluble cerium (IV) salt and water. The invention not only relates to the process of removal of contamination adhering to stainless steel surface, but to the composition used for such removal.

BACKGROUND OF THE INVENTION

Devices used in processing silver halide based-photographic elements, such as paper and film, can become contaminated with deposits containing silver and other components. Such deposits arise from processing agents, or the action of such agents on the photographic element. The deposits are unsightly, and can diminish the quality of photographic images made from elements processed.

In the past, dichromates have been employed to remove the deposits. Such methods are no longer in favor because of adverse environmental effects of chromium-containing effluents.

British 1,430,713 suggests the use of acidic cerium solutions as cleansing agents to be used instead of dichromate-containing preparations. Results with the suggested cleansing agents have not been entirely satisfactory, however. Thus, when the prior art cerium preparations are employed, an unacceptable brown stain appears on stainless steel.

Applicants have discovered that quite unexpectedly, acetic acid inhibits or prevents the formation of the brown stain.

SUMMARY OF THE INVENTION

This invention relates to a method for cleaning equipment used in photographic processing. More particularly, the invention relates to removal of silver-containing deposits from photographic equipment such as racks, tanks, and rollers that are employed in automatic developing machines. In the course of removal of silver from the contaminated equipment, other materials that are deposited on the equipment and considered undesirable can also be removed. Thus, for example, gelatin and organic tars can be removed while the deposit of silver is removed.

The method of this invention is particularly well suited for removal of silver and other contaminants adhering to stainless steel surfaces of photographic processing equipment. When prior art cerium-containing solutions are used to remove silver from such equipment a brown stain, which may be a cerium oxide, is formed on the stainless steel surface. It has been discovered that the brown stain can be inhibited or prevented from being formed by incorporation of acetic acid in an aqueous cleaner that contains a mineral acid and a soluble cerium salt. This property of acetic acid was unknown in the art.

Thus, the process of this invention is particularly efficacious for use in recovery of silver values from stainless steel surfaces exposed to processes employed to develop images from silver halide based photographic elements. The silver removal is without problems inherent in prior art methods that are based on the use of dichromate-based cleaning solutions. Although the corrosion due to the agents of this invention is somewhat higher than the corrosion that occurs when dichromate-based preparations are used, the alleviations of the environmental problems associated with chromium, and inhibition of the brown stain, makes the process of this invention readily adaptable by industry, and to be considered a substantial advance over the art.

DESCRIPTION OF PREFERRED EMBODIMENTS

In a main embodiment, this invention comprises a process of cleaning a stainless steel photographic processing device to remove silver thereform, said method comprising contacting said device with an aqueous solution comprising a cerium (IV) compound dissolved therein, a mineral acid, and a brown oxide inhibiting amount of acetic acid; said solution being further characterized by having a pH no greater than 1.

In another main embodiment, this invention comprises a composition suitable for cleaning a stainless steel surface by removal of a silver-containing deposit from such surface without the formation of a brown stain, said process comprising in weight percent:

| | |
|---|---|
| water | 87–93% |
| soluble cerium (IV) salt | 3–7% |
| nitric acid | 2–3% |
| acetic acid | 2–3% |

In the process of this invention, a stainless steel surface having a silver-containing deposit adhering thereto, such as a deposit formed during image-forming processing of a silver halide-based photographic element, is contacted with a solution of the type described above.

The process is conducted under conditions in which the amount of silver or other objectionable deposit is removed from the surface to the desired extent. In this regard, the disappearance of the yellow color from the cerium (IV) solution can be used as an indicated of when the oxidizing action of the Ce (IV) cleaning agents is spent.

The contacting can be conducted at any convenient temperature, e.g. ambient temperature. The cleaning action can be enhanced if the temperature is somewhat elevated, e.g. up to about 70° C. or higher, if desired.

The process can achieve good results in many instances if the cleansing solution and surface to be cleaned are contacted for a few minutes, e.g. up to an hour or so. More intractable objectionable surface contamination can be removed by longer treatment times, e.g. 8 hours, overnight, or longer, say up to 24 hours, or more.

The cerium salt should be soluble in the composition of the invention. By soluble, I mean that at least about 0.1 grams of cerium salt dissolve at 20° C. in a 100 ml portion of liquid comprising 2.5 ml nitric acid (70%) and 10 ml glacial acetic acid. Cerium ammonium nitrate is an example of a soluble cerium (IV) salt. Other examples of suitable cerium oxidants useful in this invention are ceric ammonium sulfate, ceric sulfate, and ceric nitrate. Cerium oxides, hydroxides, ceric (IV) fluoride, ceric (IV) iodate, and all cerium (III) salts are not efficaciously employed in this invention.

The silver deposit removed by the process of this invention need not be elemental silver. Besides being elemental silver, the silver containing deposit to be removed can be completely or partially composed of silver sulfide or other silver-containing species formed from processing agents such as developers, any silver halide material such as bleaches, fixes, etc. when they contact black and white, color, or X-ray film, or black and white or color paper.

EXPERIMENTAL

Various cleaning solutions were prepared having the compositions set forth in Table I. Solution 3 is a composition of this invention.

TABLE 1

| | SOLUTION | | | | | |
|---|---|---|---|---|---|---|
| COMPONENT | #1 | #2 | #3 | #4 | #5 | #6 |
| Ceric ammonium nitrate | 54.8 g | — | 54.8 g | — | 54.8 g | — |
| Ceric ammonium sulfate | — | 31.6 g | — | 63.2 g | — | — |
| Sulfuric acid | — | 25 ml | — | 25 ml | 25 ml | 4.7 ml |
| Nitric acid | 25 ml | — | 25 ml | — | — | — |
| Acetic acid | — | — | 100 ml | — | 30 g | — |
| Sodium acetate | — | — | — | 25 g | — | — |
| Sodium persulfate | — | 11.9 g | — | — | — | — |
| Sodium dichromate | — | — | — | — | — | 4.7 g |
| Water to 1 liter | * | * | * | * | * | * |

The concentration of the solutions used in Table 1 were as follows:

| Solution | % by weight |
|---|---|
| sulfuric acid | 2.1% |
| nitric acid | 1.75% |
| acetic acid | 10% |

The utility of these solutions for silver and gelatin removal were compared using exposed X-ray film. Results were as follows:

TABLE II

| Formula | Silver Clearing | Gelatin Clearing |
|---|---|---|
| 1 | 2 min. | 8 hr. |
| 2 | 2 min. | 1 hr. |
| 3 | 5 min. | 1-8 hr. |
| 4 | 2 min. | 8 hr. |
| 5 | 2-5 min. | 1-8 hr. |
| 6 | 1 min. | >24 hr. |

The silver/gelatin clearing tests were carried out using 1" by 4" strips of exposed X-ray film (Kodak XRP-724 Emulsion) which were immersed in each of the solutions for varying intervals of time at room temperature. Results were reported as the time at which silver or gelatin removal occurred.

For gelatin removal, the designation "1-8 hr." indicates gelatin clearing occurred at some time between one and eight hours of contact time.

A corrosion test was carried out using $2'' \times 3'' \times \frac{1}{8}$ stainless steel plates which had been nitric acid washed to remove all traces of grease and dirt. These plates are then dried in an oven to constant mass and the weights are recorded. The corrosion testing was done by immersing the plates into the test solutions for 2 weeks at 120 degrees Fahrenheit. At the conclusion of the test, the plates are removed, again acid washed in nitric acid, dried in an oven and then weighed. The loss in mass is recorded in the following table.

TABLE III

| Formula | Wt. Loss on 316 Stainless Steel | Comments |
|---|---|---|
| 1 | 302.60 mg. | Red-brown oxide |
| 2 | 174.75 mg. | Greenish coat |
| 3 | 462.65 mg. | No coating |
| 4 | 23.4 mg. | Yellow coating |
| 5 | 1246.85 mg. | Red-brown oxide |
| 6 | 1.9 mg. | No colorations |

It is apparent that cerium (IV) formulations can be used successfully as agents for the removal of silver and organics from photographic processing. As seen in the Table II, the cerium (IV) compositions were able to oxidize silver and gelatin to a comparable level with the current chromium (VI) formulation (solution #6). The rationale had been to replace one product for another without sacrificing features. This goal has been met with acidified cerium (IV). The corrosion data, however, indicates that the cerium (IV) formulations were more corrosive than the chromium (VI) product. Considering the cleaning type usage of this product, this type of result is acceptable. The discoloration of stainless steel, on the other hand, was unacceptable from a usage standpoint. It was only through the incorporation of acetic acid into the formula as seen in solution #3 that this concern was alleviated. Formula #3 offers cleaning features and an environmentally acceptable alternative to current chromium (VI) formulations.

The invention has been described in detail above with particular reference to preferred embodiments. A skilled practitioner familiar with the above detailed description can make substitutions and modifications without departing from the scope and spirit of the claims which follow.

We claim:

1. Process for cleaning a stainless steel photographic processing device to remove silver therefrom, said process comprising;

contacting said device with an aqueous solution having a pH no greater than 1, and having dissolved therein a cerium (IV) compound, a mineral acid, and a brown oxide stain eliminating amount of acetic acid;

said process being further characterized by removal of silver from said device without the formation of a brown oxide stain on the surface of said device.

2. Process of claim 1 wherein said mineral acid is nitric acid.

3. The process of claim 1 wherein said solution has the following composition:

| Solution | % by weight |
|---|---|
| water | 83-93% |
| Soluble Ce (IV) salt | 3-7% |
| $HNO_3$ | 2-3% |
| $CH_3COOH$ | 2-3% |

4. The process of claim 3 wherein said soluble cerium (IV) salt is cerium ammonium nitrate.

* * * * *